United States Patent Office 3,537,926
Patented Nov. 3, 1970

3,537,926
CHEMICAL BRIGHTENING OF IRON-CONTAINING SURFACES OF WORKPIECES
Guenter Fischer, Ellwood City, Pa., assignor to Lancy Laboratories, Inc., Zelienople, Pa., a corporation of Pennsylvania
No Drawing. Filed June 19, 1967, Ser. No. 647,215
Int. Cl. C23f 3/04
U.S. Cl. 156—21
17 Claims

ABSTRACT OF THE DISCLOSURE

An aqueous brightening solution is made up and employed for workpieces having iron-containing surfaces, such as of steel, malleable or cast iron, or iron-containing alloys. The solution basically contains hydrogen peroxide and ammonium bifluoride with a minor concentration of a mild inorganic or organic acid in solution to provide a more economical and practical removal of metal from the surface of objects as described, with the purpose of developing a reflective surface or an improved reflectivity of the surface. For further stability of the hydrogen peroxide an aromatic carboxylic acid may be used in the solution. Also, a wetting agent may be used in the solution to reduce its surface tension.

---

This invention relates to the brightening of iron-containing surfaces of workpieces and particularly, to improved brightening solutions and methods of utilizing them to better, more quickly and economically clean workpieces having a surface iron metal content in the nature of steel, malleable or cast iron or alloys thereof.

Process solutions for cleaning ferrous metal surfaces such as a steel surface have been formulated to chemically brighten them by the action of the solution and the controlled dissolution of the metal. There have been various processes in use which depend on electrochemical action for the brightening action. A few of them are based on chemical action of acid and oxidizing agents and some use hydrogen peroxide as an oxidizing agent to aid the brightening action.

The general theory for chemical brightening is that the steel or iron oxides that form and dissolve provide a chemical film on the surface that becomes heavier and heavier in dissolved metal until an equilibrium is reached between the rate of dissolution and the diffusion into the body of the solution, and the chemical action is slowed down or stopped. Another chemical can be added to such a solution containing ions that penetrate the oxide layer to cause new dissolution reaction to take place. The action of such a chemical solution may be somewhat pulsating and at high points of the metal surface the concentration gradient in the film becomes higher than on the main body of the metal surface, itself. As a result, there is a higher diffusion rate at the higher points and more metal can be dissolved, since more can be transported from the film. Such a slow dissolution of the main body of the metal surface on which high points are preferentially attacked leads to a so-called "chemical polish" brightening action.

The problem with known or conventional chemical brightening solutions for steel or iron is the cost of operation and, in the case of hydrogen peroxide formulations, is primarily due to the rapid breakdown of the peroxide oxidizing agent as the dissolved iron in the solution is built up. Ferric ions reduce the activation energy for the decomposition of hydrogen peroxide from about 20 kcal./mole by almost 50%. One solution which has a good brightening action is called the Marshall solution and contains:

Oxalic acid—25 g./l.
Hydrogen peroxide—13 g./l.
Sulfuric acid, approximately—0.1 m./l.

Such a solution becomes unstable, however, when the iron concentration reaches about 2 to 3 g./l. level and will catalytically decompose in a few hours' time to release all the hydrogen peroxide in the form of oxygen and water.

Another conventional brightening solution contains:

Urea and ammonium bifluoride, approximately—90 g./l.
Hydrogen peroxide—80 g./l.

This solution, however: (1) does not have the pulsating action of the Marshall process and, therefore, does not produce the brightness of such a solution, and (2) becomes unstable and the hydrogen peroxide catalytically decomposes, after the iron concentration in the solution builds up to about 10 to 12 g./l.

It has thus been an object of the invention to develop a brightening solution or process that will accomplish a pulsating action of an oxalic-hydrogen peroxide mixture and which will, at the same time, maintain the peroxide stable in the solution to such an extent that it will have at least a minimum of decomposition.

Another object of the invention has been to provide a solution and process for brightening iron-containing surfaces of work pieces which will enable a quicker and better brightening action with a minimized removal of metal of the surface, and with a maximized effective use of the oxidizing action of its hydrogen peroxide content.

A further object of the invention has been to provide a brightening or cleaning solution that will have a high stability when not being used or is in an idle state and further, one which will have a more effective working life for a higher dissolved iron content;

These and other objects of the invention will appear to those skilled in the art from the description thereof and the claims.

Basically or essentially the solution of the invention is an aqueous solution containing dissolved hydrogen peroxide and ammonium bifluoride with a minor proportion of a mild organic or inorganic acid, as exemplified by the following example:

EXAMPLE I

| Chemical | Grams per liter | |
|---|---|---|
| | Range | Optimum |
| Mild inorganic or organic acid | .5–30 | 16 |
| Ammonium bifluoride | 10–80 | 50 |
| Hydrogen peroxide | 20–100 | 60 |

Such a solution operates best at a temperature of between about 70° to 100° F. and at a pH of about 3.5 to 5.0. Although some brightening may occur without the mild acid, for example, by employing only ammonium bifluoride (NH$_4$F.HF) and hydrogen peroxide (H$_2$O$_2$), the improved results of the invention are obtained using an organic or inorganic acid, such as oxalic acid (OOHCOOH.2H$_2$O)

in a minimum amount of about .5 g./l. and within the maximum of about 30 g./l. or glycolic acid (hydroxyacetic acid, CH$_2$OHCOOH) within such a range. Sulfamic acid (HSO$_3$NH$_2$) can also be substituted but within a range of 2 to 20 g./l. Oxalic acid, however, is the preferred acid constituent.

A solution having the optimum content of Example I, above, in which the acid is oxalic acid imparts an excellent brightness to simple cold rolled mild steel within a period of 5 to 10 seconds. Immersion times of up to 5 minutes may be utilized, depending on how much metal has to be removed to provide the desired bright surface. It should be pointed out that a required charactertistic of a good chemical brightening solution is that under an extended processing time period with significant metal removal, the surface will continually gain in brightness with no selective metal attack occurring, as exemplified by pitting, etching, striating, etc. A process solution, such as above set forth, is stable and can be regenerated for further iron removal by, for example, adding additional ammonium bifluoride to balance an increased iron complex formation. The working life of such a solution will extend up to about 18 g./l. iron content and the metal removal rate is rapid. A relatively fresh solution, made up in accordance with the optimum content of Example I, will remove about 0.3 g./dm.$^2$ or 4 to 5 microns of metal surface within one minute at a temperature within a range of about 70° to 80° F. As the iron concentration builds up, the dissolution rate is somewhat slowed and, at a concentration of 10 g./l. of iron, the metal removal rate is about 2 to 3 microns per minute at such a temperature.

It has been discovered that the metal removal rate or the speed of reaction can be regulated by: (1) increasing the concentration of the oxalic acid or the ammonium bifluoride within the specified ranges, (2) increasing the temperature within the specified range and thus, increasing the solution attack and (3) increasing the peroxide concentration within the range to accelerate the metal removal. The economy of using a solution of the invention depends principally on the peroxide consumption, since it is the most expensive ingredient and is the chemical that is consumed in the processing. Providing a maximum of brightening action in a minimum amount of time, with a resultant least amount of metal removal, produces the least amount of peroxide consumption. The solution of the invention as made up satisfies such a condition.

Another factor effecting the economy of a brightening solution is the quantity of iron that may be desired in one liter of the solution before it is to be considered exhausted. A third and perhaps most important factor rests in how much of the peroxide is lost due to unstable conditions leading to its catalytic decomposition during idle or standing periods, and not due to its consumption as an active oxidizer in the processing of work pieces.

A process solution of the invention will consume approximately one gram of hydrogen peroxide for each gram of iron that is removed from the metal surface, and the stability of the hydrogen peroxide in an idle or standing solution is very good. It has been established that with 8 g./l. of iron concentration in the solution, that is, after the solution has been actively used for a considerable length of time, the hydrogen peroxide loss in five days will not amount to more than 20 g./l. from an original make up of about 60 g./l. On the other hand, a typical Marshall solution will lose all of its hydrogen peroxide content in two or three hours, after the solution has gained about 2 to 3 g./l. of iron content. An ammonium bifluoride, urea solution, as described earlier, will lose peroxide at a rate of about 25 g./l. within five days from an original 80 g./l. content when an iron concentration of 8 to 10 g./l. has been reached.

It has also been discovered that an aromatic carboxylic acid will increase the stability of the hydrogen peroxide in a solution containing ferric ions. Adding a stabilizer to the basic make-up of Example I of an aromatic carboxylic or dicarboxylic acid, such as benzoic acid, or o-, m- or p- phthalic acid, salicylic acid, cinnamic acid, or mandelic acid will further reduce the hydrogen peroxide loss in an idle solution. By way of example, a process solution to which 1 g./l. of benzoic acid was added and which contained 8 g./l. of iron, showed a hydrogen peroxide loss of less than 5 g./l. after five days of standing, where the original make-up of the solution had a 60 g./l. hydrogen peroxide content.

The additional stabilizer is used in a minor proportion only and within a range of about .5 to 3 g./l. and within an optimum range of .5 to 2.0 g./l. A solution thus stabilized by such a minor ingredient content in solution also shows an increased stability at elevated temperatures. In this connection, a stabilized solution containing 5 g./l. of iron showed a loss of about 3.5 g./l. of hydrogen peroxide per day at 130° F. and about 6 g./l. per day at about 145° F., where the original hydrogen peroxide concentration was 54 g./l. The same solution, without a minor stabilizer content above discussed, on the other hand, lost 19 g./l. of hydrogen peroxide per day at 130° F. and decomposed completely at temperatures of over 130° F. Incidentally, the stabilizing additions may be termed a stabilizing compound, in that the acids or their neutral salts can be used. Also, at the pH at which the brightening solutions of the invention operate, some of the acids may be considered to have been converted to their neutral salts, with either ammonium or sodium ions present.

An additional improvement in the processing may be gained by adding a wetting agent of a non-ionic type to reduce the surface tension of the solution which has been found to lead to greater uniformity of the brightening action on the surface. The wetting agent should have a minimal foaming characteristic and should be used in only minor quantities within a range of about 0.1 to 0.5 ml./l. Amine polyglycol condensate is a representative satisfactory wetting agent that fulfills the conditions.

Again referring to Example I, I have discovered that in addition to providing an increased brightness of the processed metal surface, a solution containing a mild organic or inorganic acid, has an additional advantage as used with the other ingredients thereof, in that it has been determined that the metal surface remains in a passive condition after brightening and water rinsing. It withstands a normal trend towards rapid discoloration, rusting, and staining and retains a bright clean surface. Such a passive film which resists rusting tendencies can only be obtained using an oxalic or sulfamic acid containing solution within the ranges set forth.

As will be understood by those skilled in the art, some substitutes for recommended ingredients can be made, for instance, ammonium sulfate can be partially substituted for ammonium bifluoride, i.e., 30 g./l. of ammonium sulfate and 30 g./l. of ammonium bifluoride can be used as a substitute for 50 g./l. of ammonium bifluoride. However, the solution attack is slower and is exhausted at an iron concentration of about 10 g./l. Also, sodium or potassium fluoride may be substituted for a portion of ammonium bifluoride but, in such an event, the alkali metal content should not exceed about 20 g./l.

What I claim is:

1. A method of brightening an iron-containing surface of a workpiece which comprises, providing an aqueous treating solution containing about 20 to 100 g./l. of hydrogen peroxide, about 10 to 80 g./l. of ammonium bifluoride, and a mild acid selected from the group consisting of oxalic and glycolic in an amount of about .5 to 30 g./l. and sulfamic acid in the amount of about 2 to 20 g./l. and neutral salts of such acids, and then introducing the metal work piece into the solution and after it has been brightened thereby, removing it therefrom.

2. A method as defined in claim 1 wherein an aromatic carboxylic acid stabilizing compound of a minor amount is employed in the treating solution.

3. A method as defined in claim 2 wherein the carboxylic acid stabilizing compound is in the amount of about .5 to 3 g./l. in the treating solution.

4. In a method as defined in claim 2, wherein the aromatic carboxylic acid compound is selected from the group of benzoic, phthalic, salicyclic, cinnamic, and mandelic acids.

5. A method as defined in claim 4 wherein the carboxylic acid compound is in the amount of about .5 to 3 g./l. in the treating solution.

6. A method as defined in claim 5 wherein a nonionic wetting agent of about .1 to .5 ml./l. is employed in the treating solution.

7. A method as defined in claim 6 wherein the wetting agent is amine prolyglycol condensate.

8. A method as defined in claim 1 wherein the treating solution is maintained at a pH of about 3.5 to 5.0 during the treatment of the work piece.

9. A method as defined in claim 8 wherein the solution is maintained at a temperature within a range of about 70° to 100° F. during the treatment of the metal work piece.

10. A method of brightening an iron-containing surface of a metal work piece which comprises, providing an aqueous treating solution containing about 50 to 70 g./l. of hydrogen peroxide, about 40 to 60 g./l. of ammonium bifluoride, about 10 to 20 g./l. of oxalic acid, and about .1 to 1.5 g./l. of benzoic acid, maintaining the treating solution at a pH of about 3.8 to 4.3 and within an operating temperature of about 70° to 100° F. while introducing the workpiece therein, after the work piece has been brightened by the solution and removing it therefrom.

11. A chemical-brightening aqueous solution for steel surfaced work pieces which contains in solution, 20 to 100 g./l. of hydrogen peroxide, 10 to 80 g./l. of ammonium bifluoride, and an acid selected from the group consisting of oxalic and glycolic acids in the amount of about .5 to 30 g./l. and sulfamic acid in the amount of about 2 to 20 g./l. and their neutral salts, and having a pH of about 3.5 to 5.0.

12. An aqueous solution as defined in claim 11 wherein the solution additionally contains an aromatic carboxylic acid stabilizer within a range of about .5 to 3.0 g./l.

13. A chemical solution as defined in claim 12 wherein its temperature is maintained at about 70° to 100° F. during its utilization.

14. A method as defined in claim 12 wherein the aromatic carboxylic acid is selected from the group consisting of benzoic, o-, m- and p- phthalic, salicyclic cinnamic and mandelic acids.

15. A chemical brightening solution as defined in claim 12 wherein a non-ionic wetting agent is contained in the treating solution within the range of about .1 to .5 ml./l.

16. A chemical brightening solution as defined in claim 15 wherein said wetting agent is an amine polyglycol condensate.

17. A chemical brightening solution as defined in claim 12 wherein, chemicals selected from the group consisting of ammonium sulfate, sodium and potassium fluorides are partially substituted for ammonium bifluoride, and the alkaline metal content is within a maximum of 20 g./l. when the substitutes are selected from the group consisting of sodium and potassium fluorides.

References Cited
UNITED STATES PATENTS 3,369,914 2/1968 Lacal _____ 156—20
3,407,141 10/1968 Banush et al. _____ 252—79.4

JACOB H. STEINBERG, Primary Examiner

U.S. Cl. X.R.

252—79.3 79.4

UNITED STATES PATENT OFFICE
CERTIFICATE OF CORRECTION

Patent No. 3,537,926    Dated November 3, 1970

Inventor(s) Guenter Fischer

It is certified that error appears in the above-identified patent and that said Letters Patent are hereby corrected as shown below:

Column 2, line 5, change "0.1 m./L" to --0.1 ml./l.--.

Column 3, line 9, correct the spelling of "stirating".

Column 5, line 1, (claim 4), after "group" insert --consisting--. Line 10 (claim 7) correct the spelling of "polyglycol".

SIGNED AND SEALED
JAN 5 1971

(SEAL)
Attest:

Edward M. Fletcher, Jr.
Attesting Officer

WILLIAM E. SCHUYLER, JR.
Commissioner of Patents